United States Patent
Liu

(10) Patent No.: US 11,231,752 B2
(45) Date of Patent: Jan. 25, 2022

(54) HINGE FOR FLEXIBLE SCREEN MOBILE TERMINAL AND A FLEXIBLE SCREEN MOBILE TERMINAL

(71) Applicant: HANGZHOU AMPHENOL PHOENIX TELECOM PARTS CO., LTD., Zhejiang (CN)

(72) Inventor: Xiaojie Liu, Zhejiang (CN)

(73) Assignee: HANGZHOU AMPHENOL PHOENIX TELECOM PARTS CO., LTD., Zhejiang (CN)

( * ) Notice: Subject to any disclaimer, the term of this patent is extended or adjusted under 35 U.S.C. 154(b) by 93 days.

(21) Appl. No.: 16/619,043

(22) PCT Filed: May 30, 2018

(86) PCT No.: PCT/CN2018/088967
§ 371 (c)(1),
(2) Date: Dec. 3, 2019

(87) PCT Pub. No.: WO2018/223875
PCT Pub. Date: Dec. 13, 2018

(65) Prior Publication Data
US 2020/0097051 A1    Mar. 26, 2020

(30) Foreign Application Priority Data
Jun. 6, 2017 (CN) .......................... 201720645115.5

(51) Int. Cl.
*G06F 1/16* (2006.01)
*H04M 1/02* (2006.01)

(52) U.S. Cl.
CPC .......... *G06F 1/1681* (2013.01); *G06F 1/1652* (2013.01); *H04M 1/0216* (2013.01)

(58) Field of Classification Search
CPC .. G06F 1/1681; G06F 1/1652; H04M 1/0216; H04M 1/0222
See application file for complete search history.

(56) References Cited

U.S. PATENT DOCUMENTS 9,268,372 B1 * 2/2016 Hsu ........................ G06F 1/1681
9,798,359 B2 * 10/2017 Seo ........................ G06F 1/1681
(Continued)

FOREIGN PATENT DOCUMENTS

CN         205750631 U      11/2016
CN         205847346 U      12/2016
(Continued)

*Primary Examiner* — Rockshana D Chowdhury
*Assistant Examiner* — Douglas R Burtner
(74) *Attorney, Agent, or Firm* — Muncy, Geissler, Olds & Lowe, P.C.

(57) ABSTRACT

Provided in the present invention is a flexible-screen mobile terminal hinge. The hinge comprises a plurality of links, adjacent links being rotatably connected by means of a connection structure. The hinge is further provided with an extensible positioning device; the extensible positioning device is provided with a left extensible connection frame, a right extensible connection frame, and a middle connection frame, the left extensible connection frame and the right extensible connection frame are respectively rotatably connected to the middle connection frame, and the middle connection frame is fixed together with a middle link of the plurality of links; left and right end links in the plurality of links, the left extensible connection frame and the right extensible connection frame are each provided with a connection portion capable of connecting to a mobile terminal. Also provided in the present invention is a flexible-screen mobile terminal provided with the flexible-screen mobile terminal hinge. The present invention achieves advanced functions, such that when the flexible screen is unfolded or (Continued)

folded, the flexible-screen mobile terminal has a convenient operation and stable positioning, providing a good operation experience.

9 Claims, 6 Drawing Sheets

(56) References Cited

U.S. PATENT DOCUMENTS

| | | | | |
|---|---|---|---|---|
| 10,437,293 | B2* | 10/2019 | Bitz | G06F 1/1679 |
| 10,575,415 | B2* | 2/2020 | Shin | H01L 51/0097 |
| 10,627,867 | B2* | 4/2020 | Cheng | H04M 1/02 |
| 2011/0000136 | A1* | 1/2011 | Brun | E05D 11/0081 |
| | | | | 49/358 |
| 2012/0044620 | A1* | 2/2012 | Song | G06F 1/1681 |
| | | | | 361/679.01 |
| 2012/0182677 | A1 | 7/2012 | Seo | |
| 2017/0048996 | A1* | 2/2017 | Han | H05K 5/0217 |
| 2017/0090523 | A1* | 3/2017 | Tazbaz | G06F 1/1681 |
| 2018/0067519 | A1* | 3/2018 | Tazbaz | G06F 1/1637 |
| 2018/0136696 | A1* | 5/2018 | Chen | G06F 1/1652 |
| 2018/0242446 | A1* | 8/2018 | Cho | H05K 1/0281 |
| 2018/0292860 | A1* | 10/2018 | Siddiqui | G06F 1/1618 |
| 2018/0324964 | A1* | 11/2018 | Yoo | G06F 1/1681 |

FOREIGN PATENT DOCUMENTS

| | | |
|---|---|---|
| CN | 206100081 U | 4/2017 |
| CN | 206100088 U | 4/2017 |
| EP | 2421231 A1 | 2/2012 |

\* cited by examiner

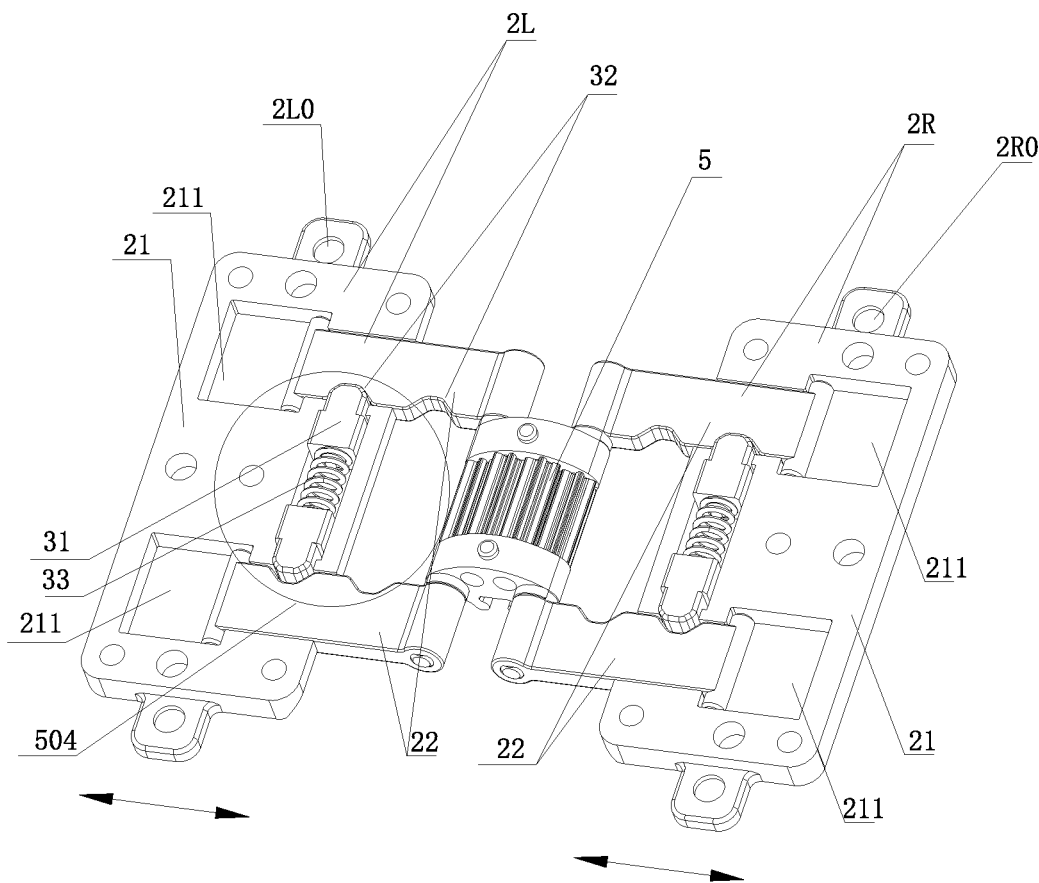
Fig. 2
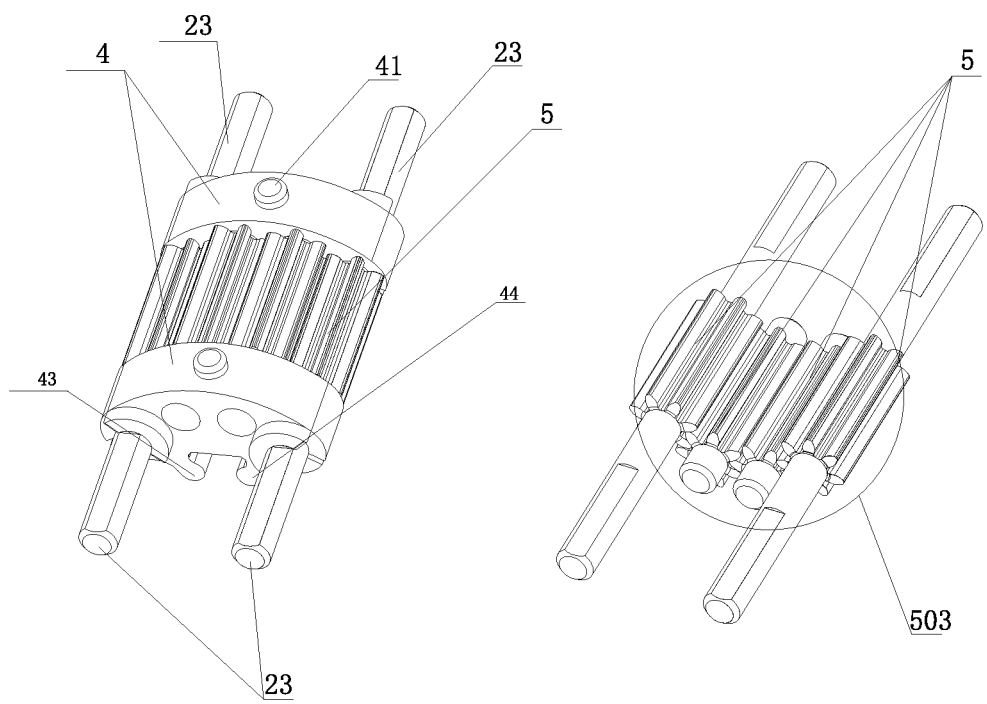
Fig. 3
Fig. 4

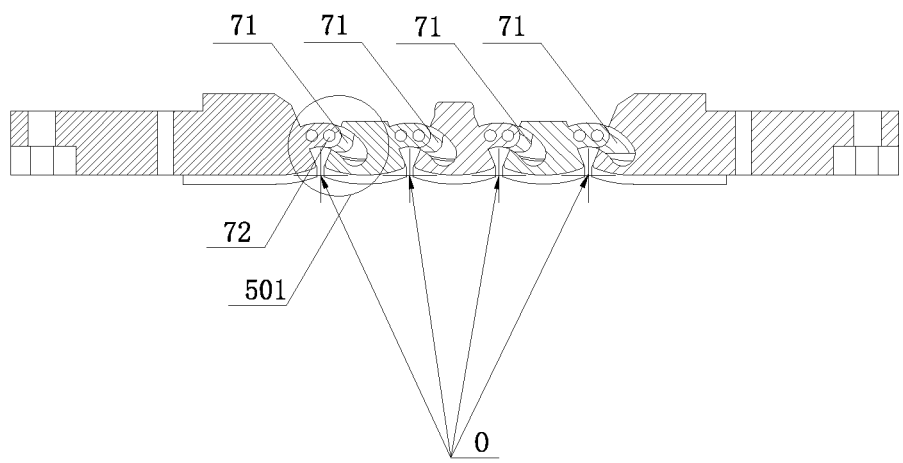
Fig. 5
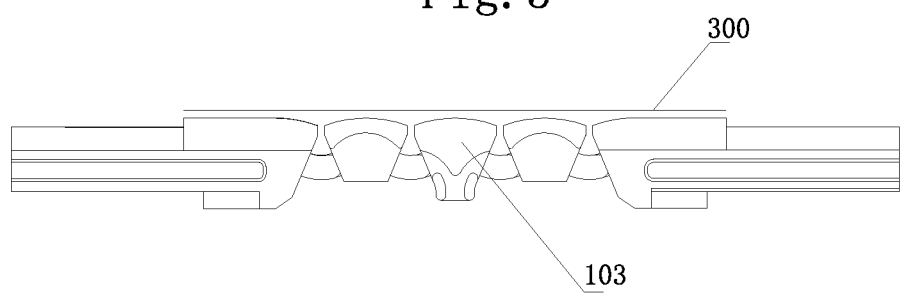
Fig. 6
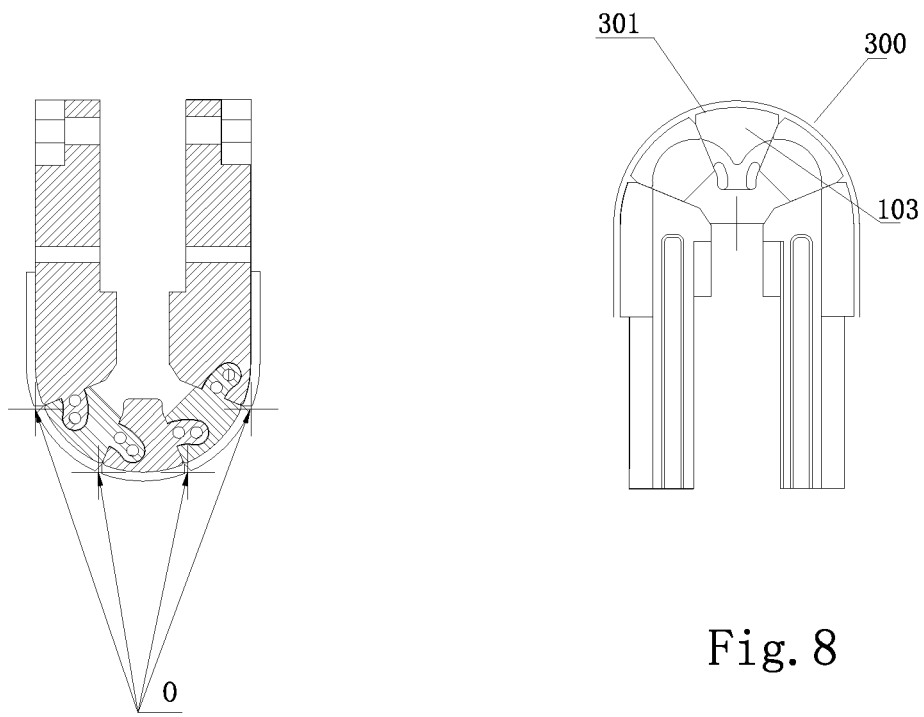
Fig. 7
Fig. 8

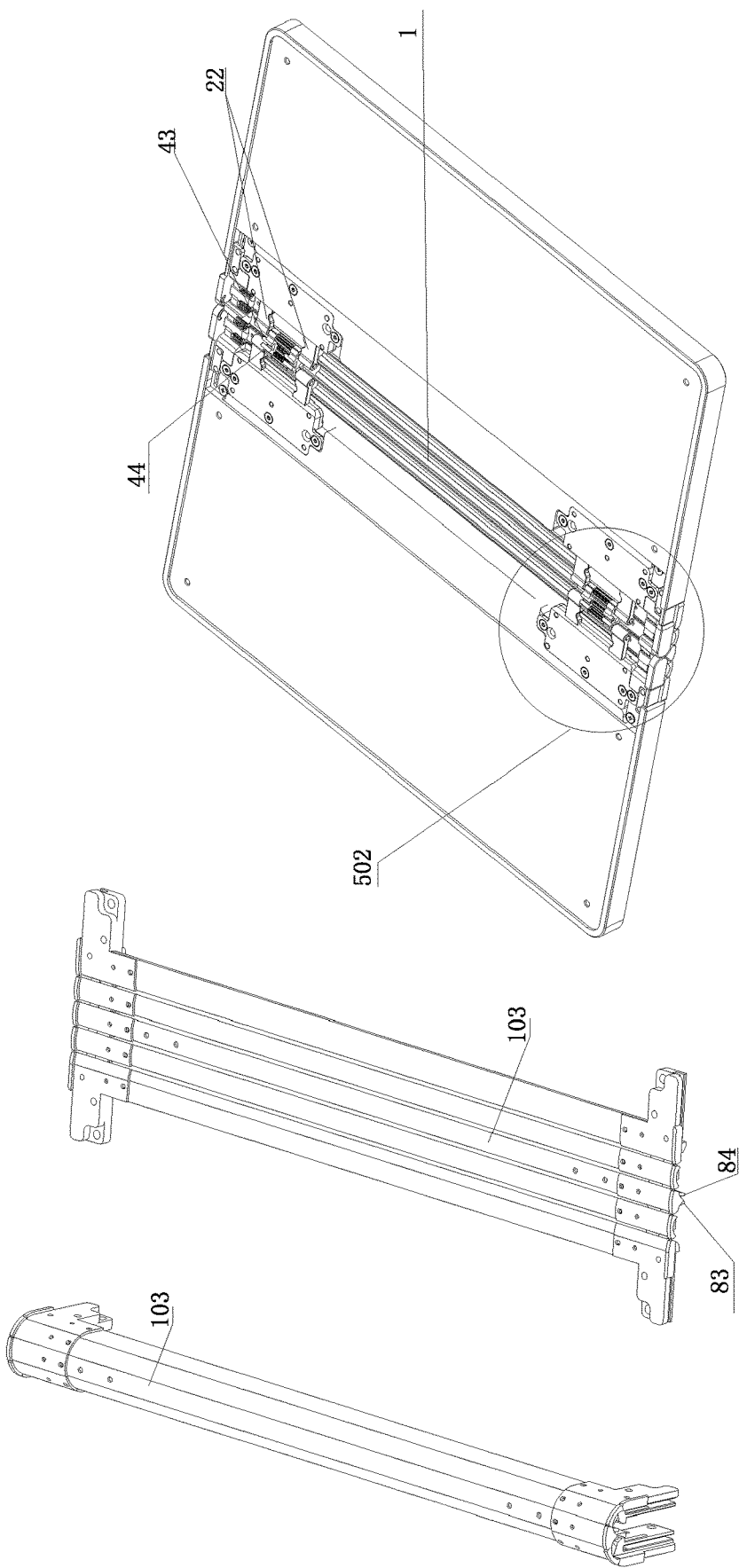

HINGE FOR FLEXIBLE SCREEN MOBILE TERMINAL AND A FLEXIBLE SCREEN MOBILE TERMINAL

FIELD OF THE INVENTION

The present invention relates to a hinge for flexible screen mobile terminal and a flexible screen mobile terminal.

BACKGROUND OF THE INVENTION

Flexible screens are emerging screens. For flexible screens, it is required to design a kind of hinge, which makes the length of the support surface of the flexible screen constant or little change during bending and flattening and is easy to use, such that the flexible screens can be commercialized and applied to mobile terminals such as mobile phones and notebooks, etc.

SUMMARY OF THE INVENTION

One object of the present invention is to provide a hinge for flexible screen mobile terminal that is applied to a mobile terminal to support a flexible screen and is convenient to use. To achieve this object, the present invention adopts the following technical solutions.

A hinge for flexible screen mobile terminal, comprising a plurality of links, the adjacent links are rotatably connected by a connecting structure, wherein the hinge is further provided with a telescopic positioning device; the telescopic positioning device is provided with a left-side telescopic connection frame, a right-side telescopic connection frame and an intermediate connection frame, the left-side telescopic connection frame and the right-side telescopic connection frame are rotatably connected to the intermediate connection frame respectively, the intermediate connection frame and a middle link of the plurality of links are fixed together; the left and right end links of the plurality of links and the left-side telescopic connection frame and the right-side telescopic connection frame are respectively provided with a connecting part that can be connected to the mobile terminal.

On the basis of the foregoing technical solutions, the present invention may adopt the following further technical solutions or use these further technical solutions in combination.

A synchronous reverse transmission mechanism is provided between the left-side telescopic connection frame and the right-side telescopic connection frame, such that the left-side telescopic connection frame and the right-side telescopic connection frame can synchronously rotate in an opposite direction.

A positioning structure for telescoping the telescopic connection frame is provided in the telescopic connection frame.

The positioning structure comprises a sliding cam connected to a first frame in a telescopic connection frame and a supporting spring thereof, and a positioning slot cooperating with a cam on a second frame slidably connected to the first frame, there are at least two positioning slots, corresponding to two limits of a telescopic stroke respectively.

The first frame has two guiding grooves, and the second frame is divided into two separate components, one end of which is slidably connected to the two guiding grooves, and the other end is connected to a rotating shaft, and the sliding cam and the supporting spring thereof is between two separate components, and the positioning slot is disposed on the two separate components of the second frame.

The transmission component in the synchronous reverse transmission mechanism is disposed on the intermediate connection frame and on the rotating shaft of the telescopic connection frame.

The number of links is an odd number, and the intermediate connection frame is connected with a centered link.

The telescopic positioning device is located at the inside of the link.

The center of rotation of the links is located at the outside of the link, and the line forms a neutral layer at which the flexible screen is located.

The intermediate connection frame is provided with an elastic hole that is connected to the telescopic connection frame and has a side opening.

The intermediate connection frame is also divided into two separate components that are connected to rotating shafts of the left-side telescopic connection frame and the right-side telescopic connection frame respectively; a synchronous reverse transmission mechanism is provided between the left-side telescopic connection frame and the right-side telescopic connection frame, such that the left-side telescopic connection frame and the right-side telescopic connection frame can synchronously rotate in an opposite direction; The synchronous reverse transmission mechanism is provided between the two separate components of the intermediate connection frame; The two separate components of the second frame are respectively located outside of the two separate components of the intermediate connection frame; forming a telescopic arrangement structure of the telescopic positioning device.

Another object of the present invention is to provide a flexible screen mobile terminal, provided with a foregoing hinge for flexible screen mobile terminal, the flexible screen mobile terminal is provided with a left support plate of the flexible screen and a right support plate of the flexible screen, the left support plate of the flexible screen is connected with the left end link of the plurality of links and the left-side telescopic connection frame, and the right support plate of the flexible screen is connected with the right end link of the plurality of links and the right-side telescopic connection frame.

By adopting the foregoing technical solutions, the hinge for flexible screen mobile terminal provided by the invention has advanced functions, so that the flexible screens can be applied to a mobile terminal such as a mobile phone or a computer; when flattening and folding the flexible screen, it is easy to operate, with a stable positioning and a good feel for operations.

BRIEF DESCRIPTION OF THE DRAWINGS

FIG. 2 is a schematic diagram of the telescopic positioning device of the embodiment of the hinge for flexible screen mobile terminal of the present invention as viewed from the inside of the hinge.

FIG. 3 is a schematic diagram of the intermediate connection frame configured with a rotating shaft and a synchronous reverse transmission mechanism as viewed from the inside of the hinge.

FIG. 4 is a schematic diagram of a synchronized reverse transmission mechanism.

FIG. 5 is a schematic diagram of a hinge for flexible screen mobile terminal of the present invention.

FIG. 6 is a schematic diagram of a hinge for flexible screen mobile terminal provided with a flexible screen of the present invention when flattening.

FIG. 7 is a schematic diagram of a hinge for flexible screen mobile terminal of the present invention when folding.

FIG. 8 is a schematic diagram of a hinge for flexible screen mobile terminal provided with a flexible screen of the present invention when folding.

FIG. 9 is a schematic diagram of a plural of links of a hinge for flexible screen mobile terminal of the present invention when flattening.

FIG. 10 is a schematic diagram of a plurality of links of a hinge for flexible screen mobile terminal of the present invention when folding.

FIG. 11 is a schematic diagram of the inner side of a flexible screen mobile terminal of the present invention when flattening.

DETAILED DESCRIPTION OF THE EMBODIMENTS

Figure 1:
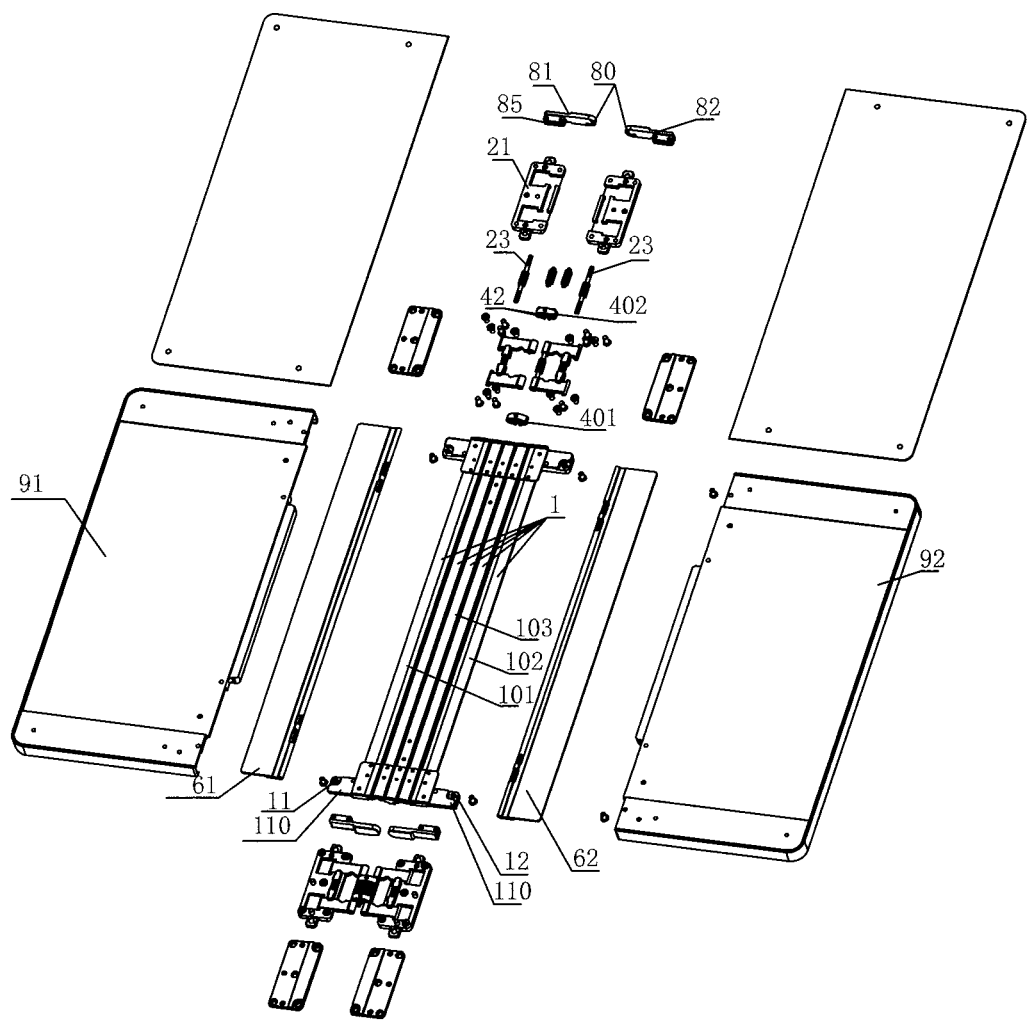
FIG. 1 is an exploded view of an embodiment of a hinge for flexible screen mobile terminal of the present invention.
Figure 13:
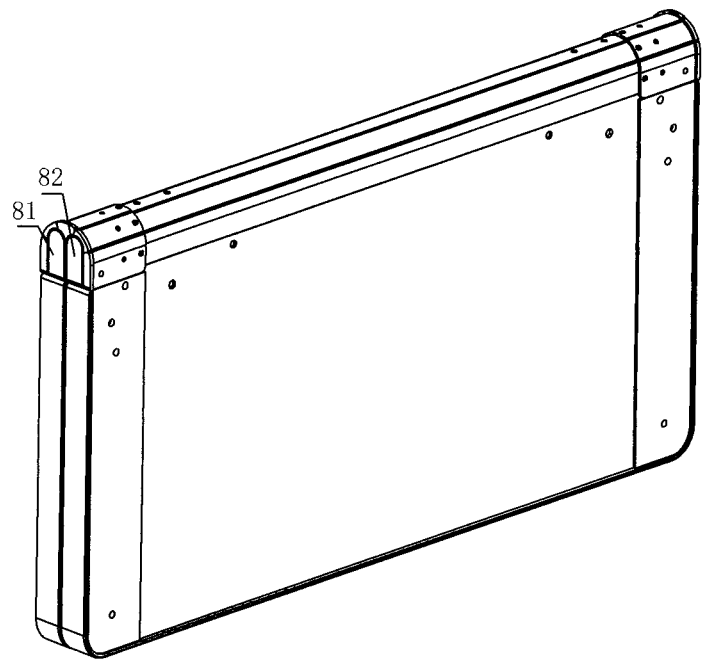
FIG. 13 is a schematic diagram of the outer side of a flexible screen mobile terminal of the present invention when folding.
Figure 12:
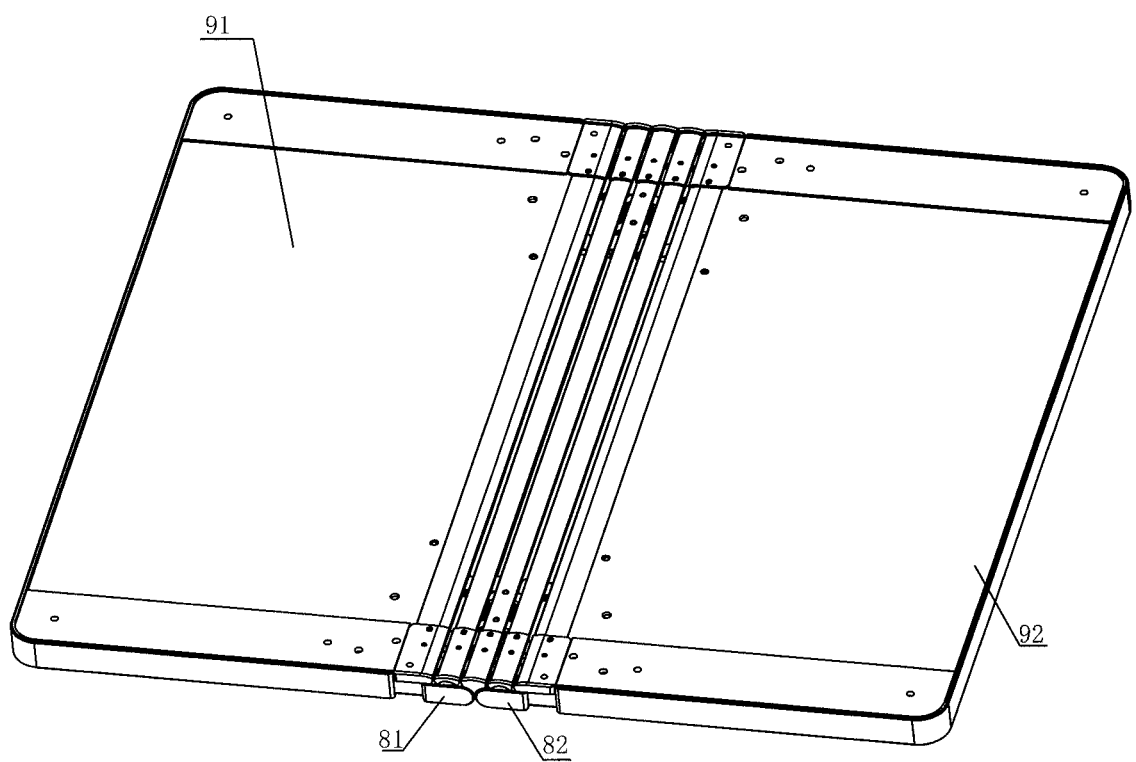
FIG. 12 is a schematic diagram of the outer side of a flexible screen mobile terminal of the present invention when flattening.
Figure 14:
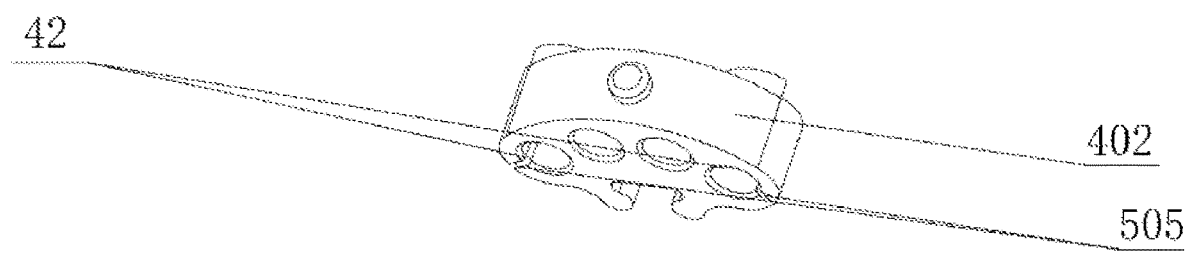
FIG. 14 is a schematic diagram of the component 402.

Referring to the figures, the hinge for flexible screen mobile terminal provided herein comprises a plurality of links 1, the adjacent links 1 are rotatably connected by a connecting structure 501, the flexible screen 300 is located at the outside of the link 1, wherein the hinge is further provided with a telescopic positioning device 502; the telescopic positioning device is provided with a left-side telescopic connection frame 2L, a right-side telescopic connection frame 2R and an intermediate connection frame 4, the left-side telescopic connection frame 2L and the right-side telescopic connection frame 2R are rotatably connected to the intermediate connection frame 4 respectively, the intermediate connection frame 4 and a middle link of the plurality of links are fixed together by welding or other fixing means. Reference numeral 41 is a stud on which the fixed connection is made on the intermediate connection frame 4. The outer side of the centered link 103 or the outer side of the link at the center preferably has a shaped surface 301 when the flexible screen is bent, for example, a cylindrical surface. The left and right end links 101, 102 of the plurality of links and the left-side telescopic connection frame and the right-side telescopic connection frame are respectively provided with connecting parts 11, 12, 2L0, 2R0 that can be connected to the mobile terminal.

The left-side telescopic connection frame 2L and the right-side telescopic connection frame 2R each comprise a first frame 21 and a second frame 22, which are slidably connected. A positioning structure 504 for telescoping the telescopic connection frame is provided in both the leftside telescopic connection frame 2L and the right-side telescopic connection frame 2R.

The positioning structure may adopt the following structure: comprising a sliding cam 31 connected to a first frame 21 in a telescopic connection frame and a supporting spring 33 thereof, and a positioning slot 32 cooperating with a cam 31 on a second frame 22, there are at least two positioning slots 32, corresponding to two limits of a telescopic stroke respectively. Alternatively, the first frame 21 is provided with a positioning slot and the second frame is provided with a spring pin.

A synchronous reverse transmission mechanism 503 is provided between the left-side telescopic connection frame and the right-side telescopic connection frame, such that the left-side telescopic connection frame and the right-side telescopic connection frame can synchronously rotate in an opposite direction.

The first frame 21 has two guiding grooves 211, and the second frame 22 is divided into two separate components, one end of which is slidably connected to the two guiding grooves 211, and the other end is connected to a rotating shaft 23, and the sliding cam 31 and the supporting spring 33 thereof is between two separate components, and the positioning slot 32 is disposed on the two separate components of the second frame 22.

The intermediate connection frame 4 is also divided into two separate components 401, 402, and the components 401, 402 are connected to the rotating shafts 23 of the left-side telescopic connection frame and the right-side telescopic connection frame.

The synchronous reverse transmission mechanism is provided between the left-side telescopic connection frame 2L and the right-side telescopic connection frame 2R. The synchronous reverse transmission mechanism is disposed between two separate components 401, 402 of the intermediate connection frame 4.

The two separate components of the second frame 22 are respectively located outside the two separate components of the intermediate connection frame 4; forming a telescopic arrangement structure of the telescopic positioning device.

The synchronous reverse transmission mechanism may be a synchronous reverse transmission mechanism driven by a gear or a synchronous reverse transmission mechanism controlled by a cam, etc.

The transmission component in the synchronous reverse transmission mechanism is disposed on the intermediate connection frame 4 and on the rotating shaft 23 of the telescopic connection frame. In the present invention, the synchronous reverse transmission mechanism uses a gear transmission mechanism for four sequentially engaged gears 5, and the first and fourth gears of the four gears are disposed on the rotating shaft 23, and the second and third gears are connected on the intermediate connection frame 4.

The telescopic positioning device is located on the inside of the link.

The center of rotation O of the link 1 is located on the outer side of the link, and the line forms a neutral layer at the position where the flexible screen is located, so that the flexible screen 300 laid on the outer side of the hinge is substantially unchanged in bending and unfolding.

The connecting structure between the adjacent links 1 includes a circular guiding groove 71 on the first link in the adjacent two links and a guide pin 72 on the second link in the adjacent two links. The guide pin 72 passes through the circular guiding groove 71 and can slide along the circular guiding groove 71. The center of the circular guiding groove 71 is the center of rotation O.

The circular guiding groove 71 cooperates with the guide pin 72, and also serves as a limiting slot for the rotation angle of the adjacent two links. The circular guiding groove 71 is disposed at both ends of one side of the front side and the rear side of the link 1, and the guide pin 72 is disposed at both ends of another side of the front side and the rear side of the link 1. The guide pins 72 in the circular guiding groove 71 are the two guide pins arranged along the length direction of the circular guiding groove, providing the effects of reliable positioning, limiting function and link rotation.

The outer side surface of the link 1 adopts a convex curved surface as a support portion for supporting the flexible screen, so as to avoid the adverse effect of the edge portion of the link on the flexible screen during bending, and it is possible to form an approximate arc after bending of the hinge to provide a more even support base.

The number of links is preferably an odd number, and the intermediate connection frame 4 and the centered link 103 are connected; or it is an even number, and the two links of the middle portion are connected to the intermediate connection frame 4. There are five links provided in this embodiment, and it is in a flattening state at the maximum opening angle. The number of the plurality of links 1 can also be adjusted according to design requirements.

The connecting parts 11, 12 can be on separately manufactured component 110, and the component 110 is placed on the left and right end links 101, 102.

A left slide cover 81 and a right slide cover 82 are further provided at both ends of the hinge to shield the inner gap of the hinge at the end face. One ends of the left slide cover 81 and the right slide cover 82 are slidably connected to the shafts 83, 84 on the middle link by the arcuate slot 80 thereon, and the other ends of the left slide cover 81 and the right slide cover 82 are slidably connected to the side face of the component 110 by the slide rails 85 thereon, which slide back and forth during the opening and closing of the hinge to cover the inner gap of the hinge.

The intermediate connection frame 4 is provided with a hole 42 connected to the rotating shaft 23 of the telescopic connection frame, the hole is a side-opening elastic hole having a side opening 505, and the elastic hole 42 and the rotating shaft 23 cooperate to provide the resistance for opening and closing of hinge, and provide instant stop and instant positioning functions during the opening and closing process of the hinge for flexible screen mobile terminal, that is, when the frictional force is overcome by an external force, the hinge can continue to open or close, and when the frictional force is not overcome, the hinge can maintain the current opening angle, playing a role of positioning at any time. In this way, it is not necessary to provide a torsion mechanism that provides an instantaneous positioning function in the connecting structure between the links, which can greatly simplify the structure.

The instant stop and instant positioning functions can only occur within an open angle range.

A left rotating plate 61 and a right rotating plate 62 are further provided inside of the hinge, for shielding the left side portion and the right side portion of the inner side of the hinge. The left rotating plate 61 and the right rotating plate 62 are rotatably connected to the shafts 43, 44 on the inner side of the intermediate connection frame, respectively.

The flexible screen mobile terminal provided by the present invention is provided with a left support plate 91 of the flexible screen and a right support plate 92 of the flexible screen. The left support plate 91 of the flexible screen is connected with the left end link 101 of the plurality of links and the connecting parts 11, 2L0 of the left-side telescopic connection frame, and the right support plate 92 of the flexible screen is connected with the right end link 102 of the plurality of links and the connecting parts 12, 2R0 of the right-side telescopic connection frame. The mobile terminal provided in the present invention may be a mobile phone, a computer, etc.

The foregoing description is only the specific embodiment of the present invention, but the structural features of the present invention are not limited thereto, and any changes or modifications made by those skilled in the art within the scope of the present invention shall fall within the scope of protection of the present invention.

The invention claimed is:

1. A hinge for flexible screen mobile terminal, comprising:
   a plurality of links,
   wherein adjacent links are rotatably connected by a connecting structure, wherein the hinge is further provided with a telescopic positioning device; the telescopic positioning device is provided with a left-side telescopic connection frame, a right-side telescopic connection frame and an intermediate connection frame, the left-side telescopic connection frame and the right-side telescopic connection frame are rotatably connected to the intermediate connection frame respectively, the intermediate connection frame and a middle link of the plurality of links are fixed together; left and right end links of the plurality of links and the left-side telescopic connection frame and the right-side telescopic connection frame are respectively provided with a connecting part that can be connected to the mobile terminal,
   wherein a positioning structure is provided in the left-side telescopic connection frame and the right-side telescopic connection frame,
   wherein the positioning structure comprises:
   a sliding cam connected to a first frame in the left-side telescopic connection frame and the right-side telescopic connection frame;
   a supporting spring thereof; and
   a positioning slot cooperating with a cam on a second frame slidably connected to the first frame, there are at least two positioning slots, corresponding to two limits of a telescopic stroke respectively,
   wherein the first frame has two guiding grooves, and the second frame is divided into two separate components, one end of which is slidably connected to the two guiding grooves, and the other end is connected to a rotating shaft, and the sliding cam and the supporting spring thereof are between the two separate components the second frame, and the positioning slot is disposed on the two separate components of the second frame.

2. The hinge for flexible screen mobile terminal according to claim 1, wherein a synchronous reverse transmission mechanism is provided between the left-side telescopic connection frame and the right-side telescopic connection frame, such that the left-side telescopic connection frame and the right-side telescopic connection frame can synchronously rotate in an opposite direction.

3. The hinge for flexible screen mobile terminal according to claim 2, wherein a transmission component in the synchronous reverse transmission mechanism is disposed on the intermediate connection frame and on a rotating shaft of the left-side telescopic connection frame and the right-side telescopic connection frame.

4. The hinge for flexible screen mobile terminal according to claim 1, wherein a number of the plurality of links is an odd number, and the intermediate connection frame is connected with a centered link.

5. The hinge for flexible screen mobile terminal according to claim 1, wherein the telescopic positioning device is located at an inside of the plurality of links.

6. The hinge for flexible screen mobile terminal according to claim 1, wherein a center of a rotation of the plurality of links is located at an outside of the plurality of links, and the plurality of links forms a neutral layer at which the flexible screen is located.

7. The hinge for flexible screen mobile terminal according to claim 1, wherein the intermediate connection frame is provided with an elastic hole that is connected to the left-side telescopic connection frame and the right-side telescopic connection frame, and has a side opening.

8. The hinge for flexible screen mobile terminal according to claim 1,
wherein the intermediate connection frame is divided into two separate components that are connected to rotating shafts of the left-side telescopic connection frame and the right-side telescopic connection frame respectively;
a synchronous reverse transmission mechanism is provided between the left-side telescopic connection frame and the right-side telescopic connection frame, such that the left-side telescopic connection frame and the right-side telescopic connection frame can synchronously rotate in an opposite direction;
the synchronous reverse transmission mechanism is provided between the two separate components of the intermediate connection frame;
two separate components of the second frame are respectively located outside of the two separate components of the intermediate connection frame, forming a telescopic arrangement structure of the telescopic positioning device.

9. A flexible screen mobile terminal, comprising a flexible screen, provided with a hinge for flexible screen mobile terminal of claim 1, the flexible screen mobile terminal is provided with a left support plate of the flexible screen and a right support plate of the flexible screen, the left support plate of the flexible screen is connected with the left end link of the plurality of links and the left-side telescopic connection frame, and the right support plate of the flexible screen is connected with the right end link of the plurality of links and the right-side telescopic connection frame.

\* \* \* \* \*